United States Patent
McBride (10) Patent No.: US 6,812,970 B1
(45) Date of Patent: Nov. 2, 2004

(54) VIDEO CAMERA UTILIZING POWER LINE MODULATION

(76) Inventor: Richard L. McBride, 200 Madonna Blvd., Tierra Verde, FL (US) 33715

( * ) Notice: Subject to any disclaimer, the term of this patent is extended or adjusted under 35 U.S.C. 154(b) by 0 days.

(21) Appl. No.: 09/570,978

(22) Filed: May 15, 2000

(51) Int. Cl.$^7$ .......................... H04N 5/225; H04N 7/18
(52) U.S. Cl. ...................... 348/372; 348/373; 348/151; 725/79
(58) Field of Search ................................. 348/142, 143, 348/151, 207.1, 211.2, 211.99, 373, 375, 372, 211.1; D16/203; 725/79; 307/80

(56) References Cited

U.S. PATENT DOCUMENTS

| | | | | |
|---|---|---|---|---|
| 3,891,842 A | * | 6/1975 | Strusinski | 396/200 |
| 4,120,004 A | * | 10/1978 | Coutta | 348/150 |
| 5,218,889 A | * | 6/1993 | Brockberg | 81/53.11 |
| 5,245,220 A | * | 9/1993 | Lee | 307/80 |
| 5,351,272 A | | 9/1994 | Abraham | |
| 5,559,377 A | | 9/1996 | Abraham | |
| 5,592,482 A | | 1/1997 | Abraham | |
| 5,625,863 A | * | 4/1997 | Abraham | 725/79 |
| 5,717,685 A | | 2/1998 | Abraham | |
| 5,818,127 A | | 10/1998 | Abraham | |
| 6,091,453 A | * | 7/2000 | Coan et al. | 348/373 |
| 6,259,476 B1 | * | 7/2001 | Greene | 348/151 |
| 6,324,311 B1 | * | 11/2001 | Gann | 382/312 |
| 6,525,766 B1 | * | 2/2003 | Ikoma et al. | 348/151 |
| 6,624,845 B2 | * | 9/2003 | Loyd et al. | 348/151 |
| 2002/0145677 A1 | * | 10/2002 | Ryan et al. | 348/373 |

* cited by examiner

Primary Examiner—Wendy R. Garber
Assistant Examiner—Lin Ye
(74) Attorney, Agent, or Firm—Larson & Larson, PA; Herbert W. Larson (57) ABSTRACT

A video camera system employs a standard flood lamp housing enclosing a video camera, an AC powerline encoder, a power supply and a single conductor screw-in type AC electrical fitting. The video camera is surrounded by a plurality of white infrared light emitting diodes for illuminating the environment in front of the video camera in low and no light situations. The AC electrical fitting engages an AC screw-in type receptacle. The video camera captures a video signal. The encoder modulates the video signal upon the AC powerline. A video signal decoder located at a remote location receives the modulated signal over the AC powerline, demodulates the signal and directs its output to a video monitor. The video monitor coupled to an AC outlet common to the powerline scheme in which the video camera is connected displays the captured video signal.

19 Claims, 5 Drawing Sheets

VIDEO CAMERA UTILIZING POWER LINE MODULATION

BACKGROUND OF THE INVENTION

1. Field of the Invention

This invention relates to a video camera. More particularly, it relates to a video camera concealed within an envelope of a single-conductor screw type lamp bulb housing which is capable of transmitting a video signal to a remote location via power line modulation.

2. Description of Prior Art

Video cameras are well known in the prior art. They come in many forms and sizes and can be used for a variety of purposes. Some video cameras permit the user to record the captured video signal on video tape inserted within the camera housing (i.e., a camcorder). Other video cameras however, merely transmit the captured video signal to a remote location for viewing on a monitor or recording on a video tape recorder (VTR). One use for video cameras that transmit a signal to a remote location relates to surveillance or security cameras. Typically, the cameras are discretely mounted near an area of a property in which someone wants to monitor (i.e., the front door of a building). This permits an operator to continually monitor the area of the property without physically being present at the particular location.

Although known surveillance video cameras provide some means for monitoring a property area, many deficiencies in these prior art video cameras and systems warrant improvements to be made thereupon. For instance, many surveillance video cameras require a light source to illuminate the area which is to be monitored (i.e., at night). This can draw attention to the location of the camera and the fact that the particular area is being monitored, thereby eliminating the usefulness of the surveillance camera altogether. It would therefore be useful, and an improvement over the prior art, to have a video camera that is capable of capturing its video signal in the absence of light.

Another deficiency seen in prior art surveillance video cameras relates to the proprietary wiring requirements of the video camera system. For instance, many surveillance video camera systems require separate wiring for the power source, the video signal pathway and the audio signal pathway (if audio is to be employed). If the surveillance system is being installed in a pre-existing building, some re-wiring may have to be performed. This typically raises the cost of the installation since a professional installer must be hired, since modifications to the existing structure or building may have to be made as well as the time involved in fishing wires throughout the structure. Of course, some of these problems can be alleviated if the building is "prewired" before construction is completed. However, again, this requires the talents of a professional installer (and in many places a licensed electrician) and the need to lay separate proprietary wiring throughout the building which limits flexibility in cases of changing needs (i.e., expansion of the system at a later date). Some have contemplated the use of wireless signals to transmit the video signal in an effort to alleviate some of the major deficiencies seen in the prior art. However, random signal interference and the need for signal repeaters have merely added further complications to prior art surveillance video camera systems and not solved all of the problems seen therein.

Yet another deficiency seen in prior art surveillance video camera systems relates to "obvious position location" of the cameras. A typical surveillance video camera comprises a housing which encloses circuitry from which extends an outwardly disposed lens portion pointing at the location of the property to be monitored. Of course, some advances have been made in the design of surveillance video cameras whereby the camera is hidden behind a highly reflective coated dome shaped housing mounted to the ceiling of a structure. Many would recognize these devices as the so called "eye-in-the-sky" cameras which are typically located in casinos and other highly populated areas (i.e., supermarkets and department stores). The problem with these type of "concealed" devices are that they are now widely recognized as surveillance cameras. Individuals wishing to avoid being monitored or caught on tape simply refrain from their offensive or illegal behavior until such time as they find themselves located within an area that is void of such devices.

An improvement over existing surveillance video camera systems is needed which can overcome all of the deficiencies seen in the prior art. The improved system should not be dependent on a need for daylight or for artificial lighting at night to capture its video signal. The improved system should be able to capture it signal regardless of the time of day and therefore not need artificial lighting at night. The improved system should also not be dependent on proprietary wiring. A system which could use pre-existing wiring would have an abundance of benefits over prior art devices including lower cost, elimination of the need for a professional installer, greater flexibility in the positioning of the cameras and less time consumed in the installation thereof. The improved system should also be easily concealed and not have its location disclosed based solely on existing known methods of concealment. Clearly, an improved means of concealment is needed.

In conclusion, what is needed is a surveillance video camera system which is inexpensive, easy and quick to install, has great camera positioning flexibility, all the while being concealed from intruders and other offenders that may affect offensive of illegal behavior upon individuals or real property.

SUMMARY OF THE INVENTION

We have invented an improved video camera surveillance system which overcomes all of the deficiencies seen in the prior art. Specifically, our system is inexpensive, can be quickly installed, provides the user greater position flexibility for a single camera or for multiple cameras, all while being concealed in an inconspicuous housing.

The present invention includes a video camera lens mounted within the housing of a standard single conductor screw-in type flood light bulb. The filament of the flood light bulb is absent thereby providing adequate mounting room for the video camera lens. The lamp housing does not radiate any visible light since no filament is used. During daylight hours, the flood light housing appears as any "turned-off" flood light. During night-time hours, the flood lamp appears to be off or "burned-out." The housing is also opaque thereby concealing the fact that a camera lens in enclosed therewithin. The lens is mounted on a first printed circuit board (PCB) and surrounded by a plurality of white infrared light radiating diodes which permits the lens to capture a video signal in the absence of light.

The present invention further includes an encoder (or modulator) mounted on a second PCB electrically coupled to the circuitry of the camera lens on the first PCB by a pin-header connection. The encoder receives and thereafter modulates an uncompressed video signal (a full bandwidth signal) onto the AC powerline. In a multiplexed system (i.e., use of four cameras), each video signal is encoded at a different frequency thereby providing each camera its own channel identity. A power supply with a transformer mounts behind the second PCB and is electrically coupled to the first and second PCB.

Once the video signal is modulated onto the AC powerline, it is transmitted to all AC receptacles located in the building that are part of a common electrical scheme of the building to which the flood light lamp is electrically coupled. The video signal can then be accessed at each receptacle by use of a receiver (i.e., video monitor) having a decoder located therewithin.

The decoder receives the modulated video signal over the AC powerline and demodulates the signal for viewing on a video receiver or monitor. This signal can then be recorded onto any of a plurality of recordable mediums, viewed in real time or viewed and recorded simultaneously.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Throughout the following detailed description, the same reference numerals refer to the same elements in all figures.

Figures 3, 4:
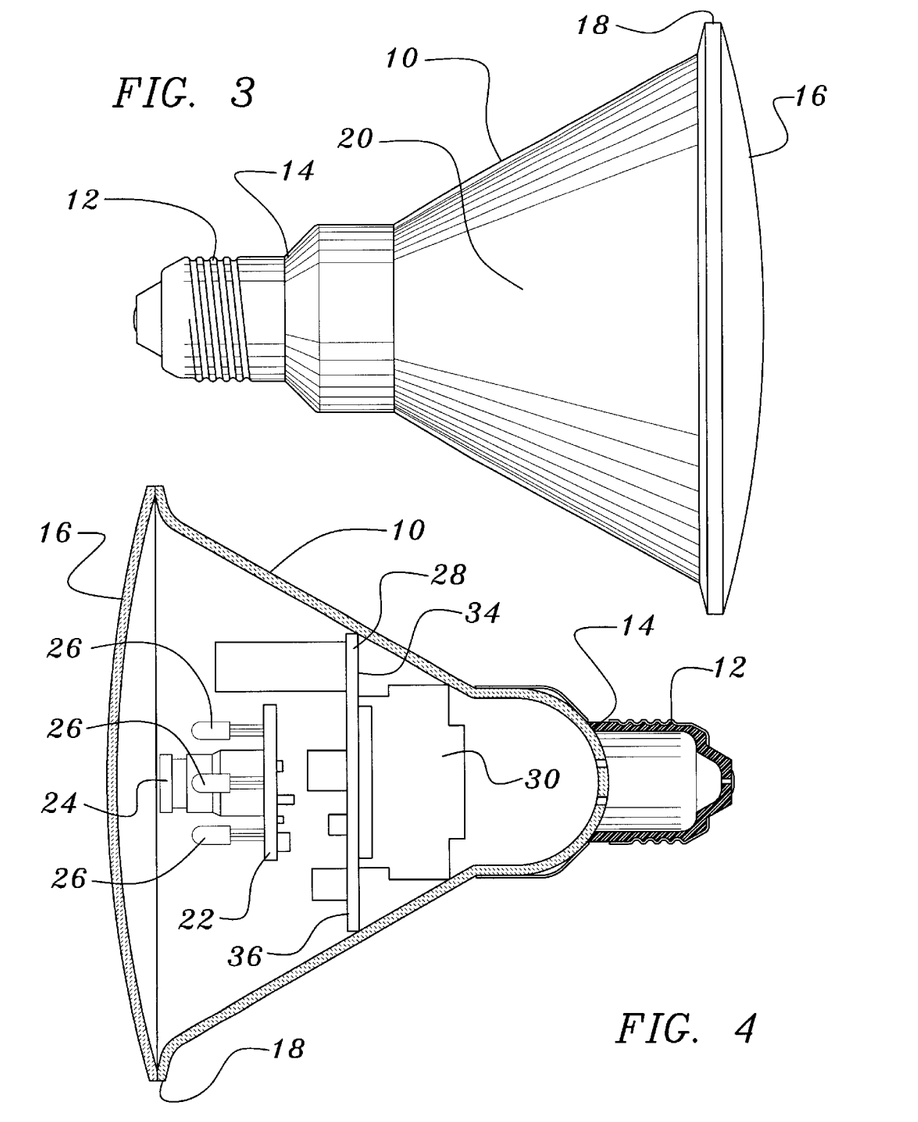
FIG. 3 is a side elevational view of a standard single conductor screw-in type flood light lamp housing used with the video camera of the present invention.
FIG. 4 is a side elevational view, partially in section, of a standard single conductor screw-in type flood light lamp housing illustrating the video camera and other electronic components, enclosed therein, used in the present invention.

Referring to FIG. 3, a housing 10 is shown which encloses electrical circuitry of the present invention. Housing 10 resembles a standard single conductor screw-in type flood light bulb. However, no filament is enclosed within housing 10. Therefore no visible light radiates from housing 10 when coupled to an AC power screw-in type receptacle. Housing 10 is generally cone-shaped and has a single conductor screw-type fitting 12 attached at a back end 14. A convexed-shaped cover 16 attaches over a front end 18 of housing 10. An outer circumference 20 of housing 10 as well as cover 16 are both opaque and thereby prohibit an individual from determining what elements are enclosed within housing 10. In the preferred embodiment, fitting 12 is a Standard Type A fitting used in residential structures in the United States. Therefore, in the preferred embodiment, the present invention is used with 110/120 volt, 60 Hz AC power schemes. However, alternate embodiments include Standard Type B industrial fittings (220/240 volt 60 Hz) as well as those fittings that correspond to other electrical standards such as, for example, 220 volt, 50 Hz AC power schemes (i.e., that which is used in Europe). It is therefore possible that the present invention can be adapted for use with all NEMA (National Electrical Manufacturers Association) standards as well as all other international electrical standards seen outside of the United States.

Figure 5:
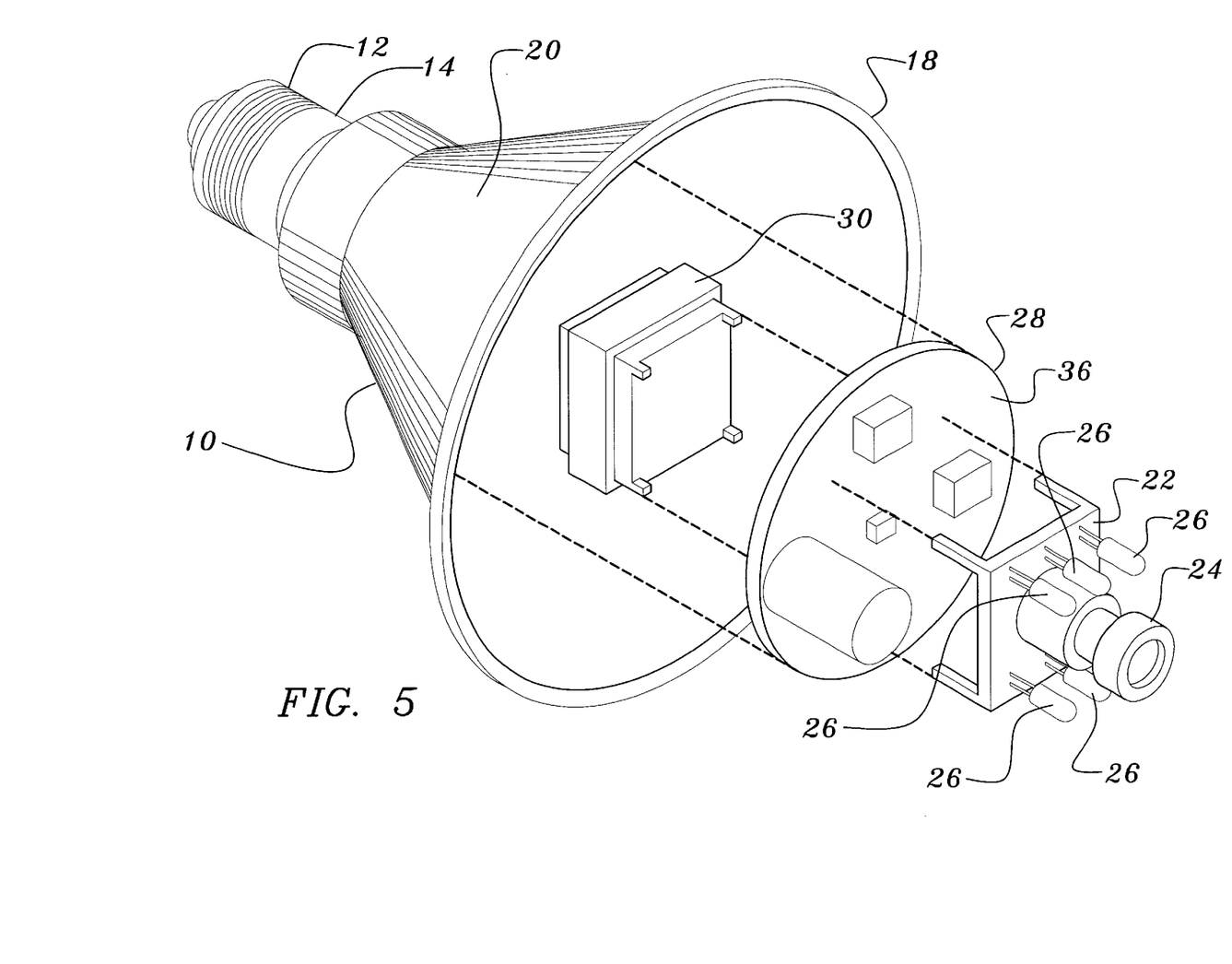
FIG. 5 is a perspective view, partially exploded, of the video camera of the present invention.

Referring to FIGS. 4 and 5, it is shown that housing 10 encloses two printed circuit boards. A first circuit board 22 includes circuitry for the capture of a video signal. Accordingly, first circuit board 22 includes a camera lens 24. First circuit board 22 further includes a plurality of white infrared diodes 26 which assist camera lens 24 in capturing video signals in the absence of light (i.e., during night-time hours). In particular, white infrared laser diodes are used which direct their output through a set of fiber optics after the diode output is varied over time. The light outputted through the fiber optics assists in illumination of the environment for camera lens 24. The voltage level applied to diodes 26 is varied over time, which varies its output, thereby producing multiple lit scenes for camera lens 24 to view. Accordingly, diodes 26 assist camera lens 24 in capturing video signals when the natural light of the sun begins to diminish near sunset as well as in complete darkness of night-time. In the preferred embodiment, six white infrared diodes are employed. During well lit hours (i.e., daytime), camera lens 24 merely captures its video signal without the assistance of the plurality of white infrared diodes 26. In the preferred embodiment, camera lens 24 captures a video signal using the NTSC standard, although the camera lens can be adapted to capture a signal using the PAL standard.

A second circuit board 28 is electrically coupled to first circuit board 22 by a pin-header connection and acts as an encoder to modulate the captured video signal over the AC powerline using powerline carrier (PLC) transmission technology. PLC technology is known in the prior art and is the subject of many U.S. Patents including U.S. Pat. No. 5,625,863 to Abraham, the disclosure of which is incorporated herein by reference. In particular, an FM technique is employed wherein the video signal is modulated onto the AC powerline as an uncompressed analog signal. However, alternate embodiments include modulating a compressed signal over the AC powerline.

First and second circuit boards, 22 and 28 respectively, are both electrically coupled to a power supply 30. Power supply 30 is a proprietary circuit which is electrically coupled to screw-type fitting 12 and provides 12 v, 5 v and −5 v DC for first and second circuit boards 22 and 28. Power supply 30 derives its own power from the 120 v AC powerline of a building or structure to which screw-type fitting 12 engages. Power supply 30 mounts to a back side 34 of second circuit board 28 (see FIG. 4). All of the electrical components of the encoder mount upon a front side 36 of second circuit board 28.

Figure 7:
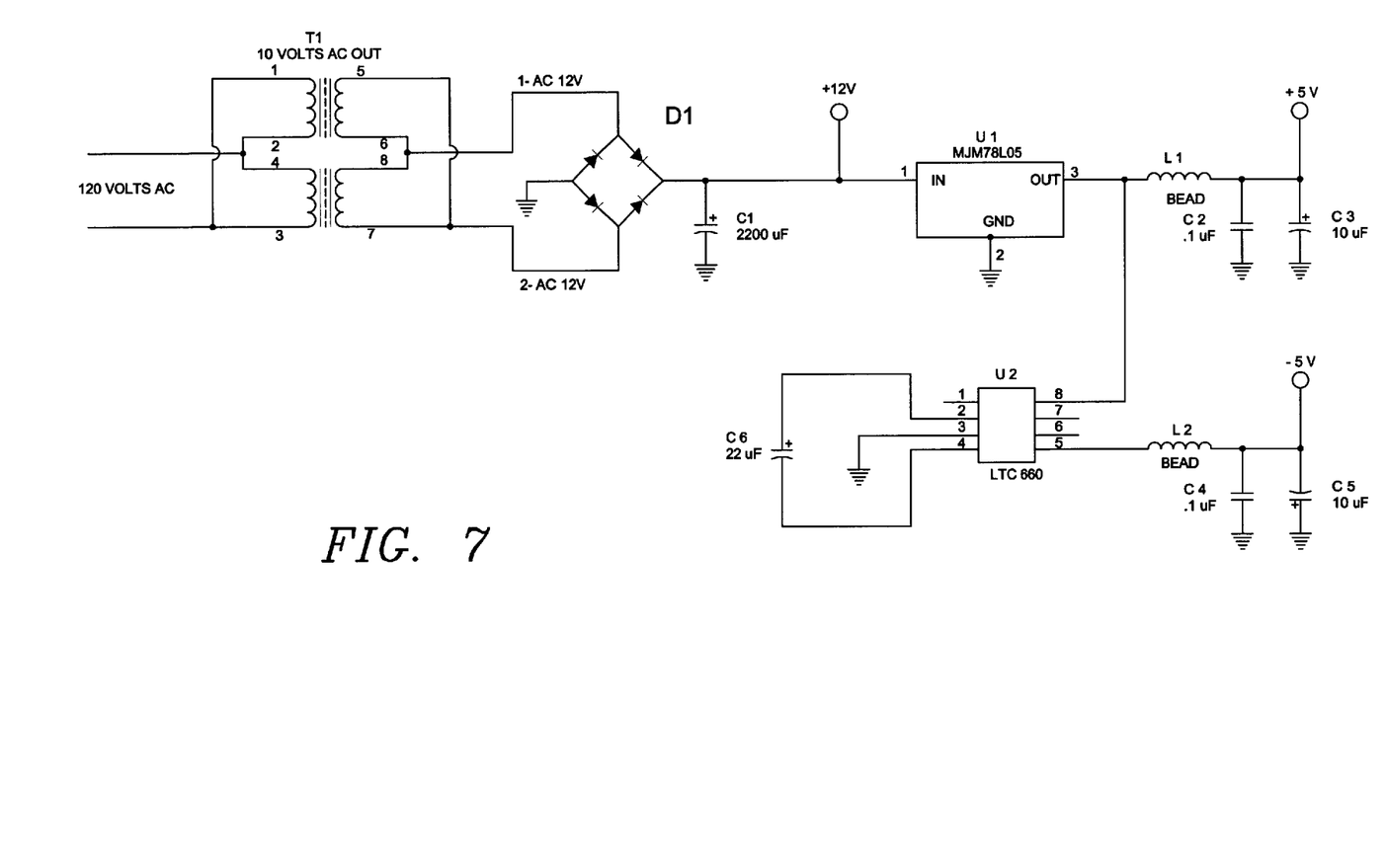
FIG. 7 an electrical schematic diagram of the power supply employed within the video camera of the present invention.

Referring to FIG. 7, an electrical schematic diagram is shown depicting the circuitry of power supply 30. As shown, power supply 30 employs a transformer T1. In the preferred embodiment, a 10 vA center taped transformer is employed having dual primaries (115 v/230 v) and dual 5 v secondaries connected in series to provide a 10 vRMS output capable of passing 600 mA of current. A bridge rectifier D1 is coupled to the output of transformer T1 and provides 12 vDC at its output. A filter capacitor C1 is coupled at its positive terminal to the 12 vDC output of bridge rectifier D1 and at its negative terminal to ground. In the preferred embodiment, a single 2200 uF polarized electrolytic capacitor is employed. However, a pair of 1000 uF polarized capacitors wired in parallel could be employed if the spacing requirements within housing 10 dictates that the single 2200uF capacitor is too large.

Further to FIG. 7, a voltage regulator U1 is coupled at a first pin 1 to the 12 vDC output of bridge rectifier D1. A second pin 2 is connected to ground, while a third pin 3 outputs a steady +5 vDC. A bead L1 is coupled to the output of U1 for dampening parasitic high frequency oscillations. Further filtration is accomplished by a pair of capacitors C2 and C3, coupled in parallel to one another, but coupled individually in series between bead L1 and ground. In the preferred embodiment, C2 is a non-polarized capacitor having a value of 0.1 uF. C3 is a polarized capacitor having a value of 10 uF with its positive terminal coupled to the +5 vDC output of voltage regulator U1 and its negative terminal coupled to ground.

With continuing reference to FIG. 7, a voltage converter U2 is coupled at its positive voltage input (pin 8) to the +5 vDC output of voltage regulator U1. The power supply ground input (pin 3) is coupled to ground. CAP+(pin 2) is coupled to the positive terminal of an external charge pump capacitor C6, whereas CAP-(pin 4) is coupled to the negative terminal of C6. In the preferred embodiment, C6 is a polarized capacitor having a value of 22 uF. LV (pin 6) and OSC (pin 7) are left floating. Vout (pin 5) is the negative voltage output providing a steady -5 vDC. A bead L2 is coupled in series with the -5 vDC output of voltage converter U2 for dampening parasitic high frequency oscillations. Further filtration is accomplished by a pair of capacitors C4 and C5, coupled in parallel to one another, but coupled individually in series between bead L2 and ground. In the preferred embodiment, C4 is a non-polarized capacitor having a value of 0.1 uF. C5 is a polarized capacitor having a value of 10 uF with its negative terminal coupled to the -5 vDC output of voltage converter U2 and its positive terminal coupled to ground. Further to the preferred embodiment, U2 is a 100 mA CMOS voltage converter, such as the Linear Technology LTC660.

In the preferred embodiment, certain orientations of the components on second circuit board 28 are employed to avoid "hum bars" —a dark horizontal band extending across a video monitor, caused by excessive hum (an electrical disturbance occurring at the power supply frequency or its harmonics) in the video signal which is then applied to the input of the video monitor picture tube. First, all video circuits should be kept outside of the footprint of transformer T1. Secondly, three ground plains should be created: a first for the video section, a second for the power section and a third for the RF section. The RF and video ground plains are then connected by separate traces to the power ground plain. And thirdly, the bridge rectifier D1 and the filter capacitor C1 should be kept very close to the secondaries of transformer T1.

Figure 6:
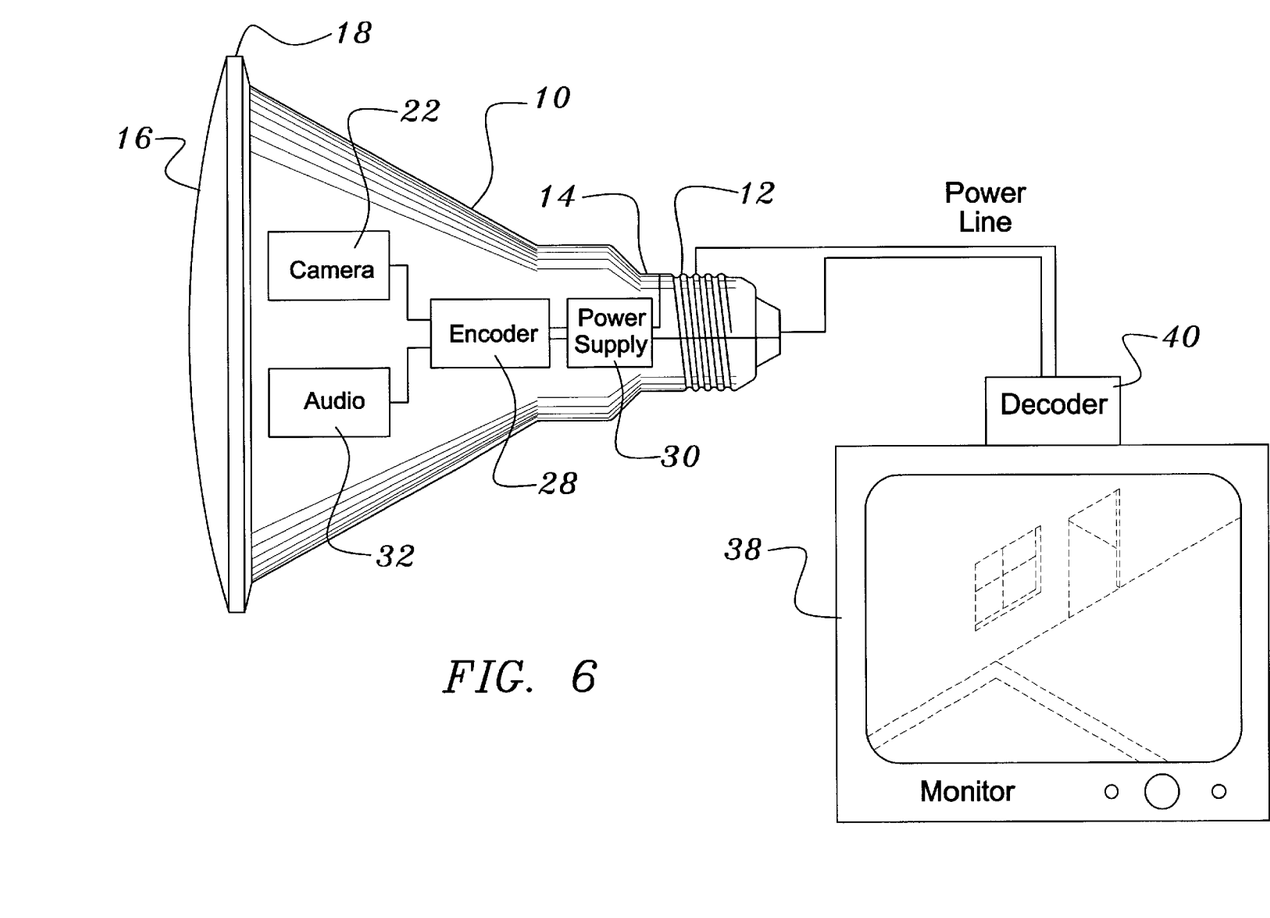
FIG. 6 is a flow diagram illustrating how the present invention modulates a video signal over the AC power lines of a structure.

Referring to FIG. 6, a block diagram is shown depicting the major elements of the present invention. As shown, an audio component 32 (i.e., a microphone) can be employed for providing audio monitoring capabilities to the system. The audio signal is modulated, just as the video signal, as an uncompressed analog audio signal onto the AC powerline utilizing PLC technology in an FM technique. After the video signal (and audio signal) is modulated onto the AC powerline, a monitor 38 located at a remote location can receive the video and audio signals. A decoder 40 mounted proximal the monitor 38, or integrally coupled within the circuitry of monitor 38, demodulates the modulated signals and permits viewing (and listening) of the signals on monitor 38. Since the modulated signal (or signals) are passed to all of the AC receptacles in a given electrical plan, the video and/or audio signals can be monitored at any receptacle within such plan, so long as monitor 38 is equipped with decoder 40, thereby providing greater flexibility to the user.

Figures 1, 2:
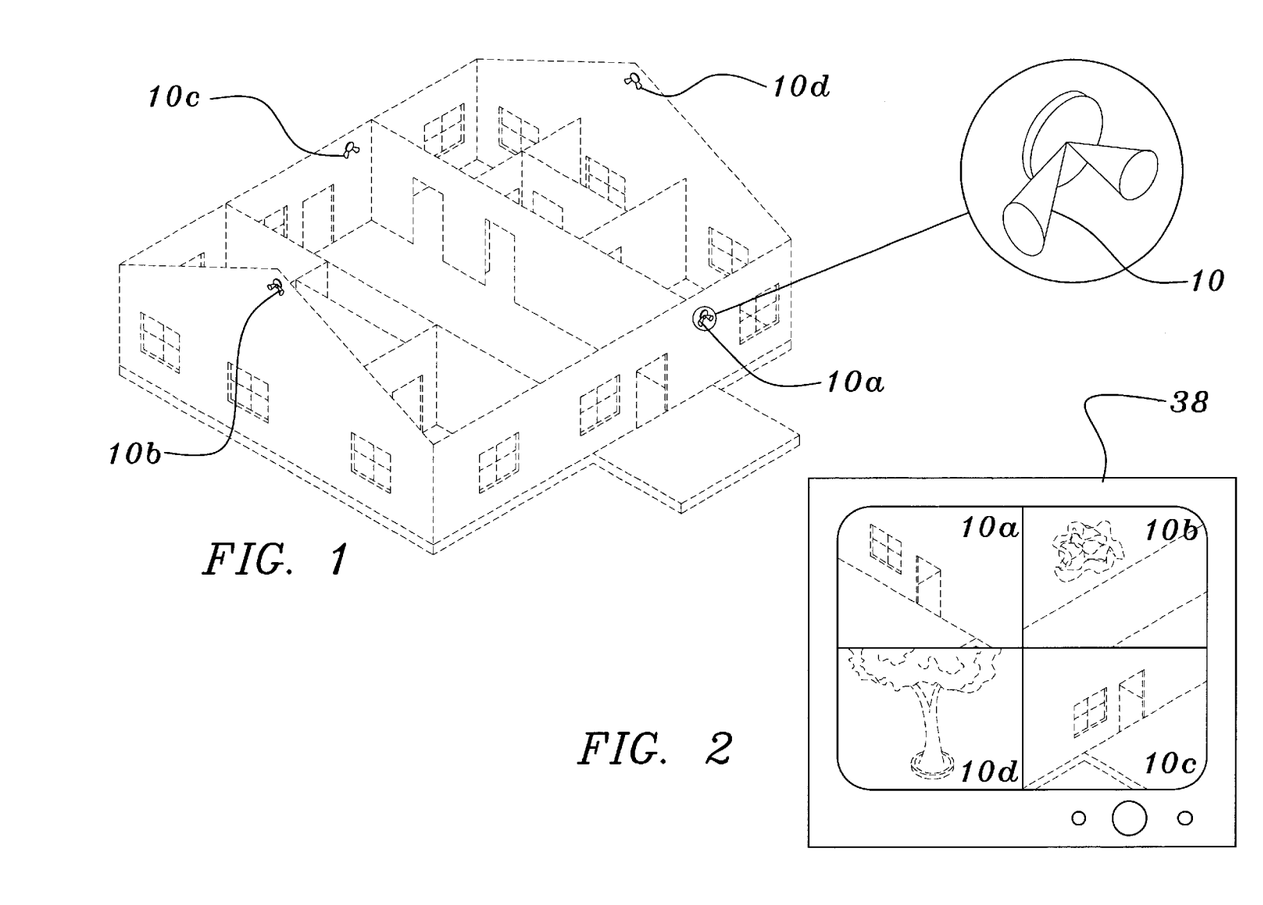
FIG. 1 is a perspective view of a house illustrating how the present invention is used wherein a set of video cameras, utilizing power line modulation, are enclosed within standard single conductor screw-type flood light lamp housings.
FIG. 2 is a front view of a video monitor illustrating the reception of four video camera signals modulated over the AC power lines of a structure used in the present invention.

In the preferred embodiment, a single camera is used as depicted in FIG. 6. However, an alternate embodiment of the present invention employs multiple video signals in a multiplexed system (see FIGS. 1 and 2). To employ a multiplexed system, a plurality of housings 10 are employed around a building or like structure, with each housing 10 containing its own camera lens 24 and other associated circuitry as set forth herein above. The preferred multiplexed system utilizes four cameras thereby providing four discrete video signals, as seen in FIGS. 1 and 2. In such a system, four decoders 40 are employed to receive and demodulate each signal. Thereafter, the four signals are directed to monitor 38 having four discrete receivers. For example, each signal can be directed to the various video and auxiliary inputs of any standard video monitor. A user can then switch between the various inputs to monitor any of the four signals. A single decoder can also be employed which is capable of demodulating and receiving all four signals and then pass the four signals to a single input on the video monitor in a split screen format, as seen in FIG. 2. Alternatively, the four signals can be switched in time using a factory preset or user set time frame such that each signal is successively viewed full screen. In yet another embodiment, a decoder mounted on a circuit board can be employed within a PC. The decoder components present upon the circuit board receive the modulated signals from the AC powerline to which the computer is plugged into. Thereafter, the signals are demodulated and directed to the PC monitor. Proprietary software can then be employed to permit the user to manipulate the signals. For example, the video signals can run in resident memory at all times while the PC is powered on, thereby permitting the user to access the signals at the click of the PC mouse. Further, the signals can be switched in time or split on the PC monitor in any user preferred order.

Still further to alternate embodiments, each camera/receiver pair in a single camera or multiplexed system can be assigned an IP address. This permits each camera/receiver pair to be accessible over a LAN or over the Internet. Accordingly, a user can access the video signal that is being captured, modulated, demodulated and viewed along an AC powerline associated with a particular building or structure from anywhere in the world that has access to an Internet connection.

In dimly lit or very dark environments, additional illumination may be required for the video camera lens 24 to capture a video signal. In such a scenario, additional IR illumination can be provided by enclosing IR diodes within a separate flood lamp housing. The housing is screwed into a separate AC flood lamp receptacle such that the housing, and therefore the IR diodes, are pointed in a direction in front of the camera lens housed within a separate flood lamp housing.

In addition to monitoring the video and/or audio signals captured by camera lens 24 and/or audio component 32 on a video monitor, the resulting signals can be directed to any of a plurality of different recording mediums, including but not limited to: video tape, hard disk, analog and digital audio tape, and recordable CD.

Equivalent elements can be substituted for the ones set forth above such that they perform the same function in the same way for achieving the same result.

What is claimed:

1. A video camera concealed surveillance system capable of capturing a video signal at a first location and directing the video signal to a video monitor located at a second location within a common AC powerline scheme, the video camera system comprising:
   a) a housing having a front and back end and an inner enclosed cavity, the front end having a larger circumference than the back end, the front end closed by a cover permitting light to pass therethrough, the back end supporting a single conductor screw-in type AC electrical fitting, the AC electrical fitting engaging an AC receptacle along the AC powerline scheme,
   b) a first circuit board enclosed within the housing cavity having a video camera mounted thereupon, the video camera disposed within the housing such that a lens of the video camera is directed towards the front end thereof,
   c) a second circuit board enclosed within the housing cavity having a video signal encoder mounted thereupon, the second circuit board electrically coupled to the first circuit board, the video signal encoder modulating the captured video signal upon the AC powerline,
   d) a power supply circuit enclosed within the housing cavity and electrically coupled to the first and second circuit boards and the AC electrical fitting,
   e) a video signal decoder electrically coupled to the video monitor at the second location, the video signal decoder capable of demodulating the captured video signal modulated upon the AC powerline by the video signal encoder and directing the captured video signal to the video monitor, and
   f) a plurality of white infrared light emitting diodes mounted upon the first circuit board around the video camera lens, the white infrared light emitting diodes illuminating the first location visible by the video camera in low or no light situations.

2. The video camera system of claim 1, wherein the housing is cone-shaped.

3. The video camera system of claim 1, wherein the second circuit board has a front and back side, the video signal encoder mounted upon the second circuit board front side and the power supply circuit mounted upon the second circuit board back side.

4. The video camera system of claim 1, wherein the power supply circuit comprises:
   a) a transformer for reducing the AC voltage,
   b) a bridge rectifier coupled to the transformer and having a DC voltage output, the bridge rectifier converting the reduced AC voltage to a DC voltage,
   c) a voltage regulator coupled to the bridge rectifier DC voltage output and having a DC voltage output, the voltage regulator providing a steady positive logic voltage for the camera system,
   d) a voltage converter coupled to the voltage regulator DC voltage output, the voltage converter providing a steady negative logic voltage for the camera system by inverting the positive logic voltage, and
   e) means for filtering parasitic high frequency oscillations introduced into the power supply circuit.

5. The video camera system of claim 4, wherein the power supply transformer is a dual primary, dual secondary, center taped transformer.

6. The video camera system of claim 5, wherein the transformer dual primary voltage is rated at 115/230 volts and the dual secondary voltage is rated at 5 volts each.

7. The video camera system of claim 6, wherein the transformer connects at its dual primaries to 120 volts AC supplied by the AC electrical fitting and outputs 10 volts DC at its dual secondaries.

8. The video camera system of claim 1, wherein the video monitor comprises a housing, a picture tube, and a receiver, the picture tube and receiver enclosed within the video monitor housing, the video signal decoder electrically coupled to the video monitor receiver within the video monitor housing.

9. The video camera system of claim 1 wherein the video monitor comprises a housing, a picture tube, and a receiver, the picture tube and receiver enclosed within the video monitor housing, the video signal decoder enclosed within a box separate from the video monitor housing, the video signal decoder electrically coupled to the video monitor receiver.

10. A video camera concealed surveillance system capable of capturing a video signal at a first location and directing the video signal to a video monitor located at a second location within a common AC powerline scheme, the video camera system comprising:
    a) at least one housing having circular front and back ends and an inner enclosed cavity, the front end having a larger circumference than the back end, the front end closed by an opaque cover, the back end supporting a single conductor screw-in type AC electrical fitting, the AC electrical fitting engaging an AC receptacle along the AC powerline scheme,
    b) a first circuit board enclosed within the at least one housing enclosed cavity and having a video camera and a plurality of white infrared light emitting diodes mounted thereupon, the video camera disposed within the at least one housing such that a lens of the video camera is directed towards the front end thereof, the plurality of white infrared light emitting diodes surrounding the video camera lens,
    c) a second circuit board enclosed within the at least one housing enclosed cavity and having a video signal encoder mounted thereupon, the second circuit board electrically coupled to the first circuit board, the video signal encoder modulating the captured video signal upon the AC powerline,
    d) a power supply circuit enclosed within the at least one housing enclosed cavity and electrically coupled to the first and second circuit boards and the AC electrical fitting, and
    e) a video signal decoder electrically coupled to the video monitor at the second location, the video signal decoder capable of demodulating the captured video signal modulated upon the AC powerline by the video signal encoder and directing the captured video signal to the video monitor.

11. The video camera system of claim 10, wherein four housings are employed, each housing enclosing its own video camera, each video camera capturing its own discrete video signal, the video monitor capable of receiving a plurality of captured video signals.

12. The video camera system of claim 11, wherein the video monitor displays the plurality of received video signals in successive order over a period of time.

13. The video camera system of claim 11, wherein the video monitor displays all of the plurality of received video signals simultaneously.

14. The video camera system of claim 10, wherein the video signal decoder is mounted on a circuit board enclosed within a PC.

15. The video camera system of claim 14, wherein the video monitor is a PC monitor.

16. The video camera system of claim 10, wherein the power supply supply circuit comprises:
   a) a transformer for reducing the AC voltage,
   b) a bridge rectifier coupled to the transformer and having a DC voltage output, the bridge rectifier converting the reduced AC voltage to a DC voltage,
   c) a voltage regulator coupled to the bridge rectifier DC voltage output and having a DC voltage output, the voltage regulator providing a steady positive logic voltage for the camera system,
   d) a voltage converter coupled to the voltage regulator DC voltage output, the voltage converter providing a steady negative logic voltage for the camera system by inverting the positive logic voltage, and
   e) means for filtering parasitic high frequency oscillations introduced into the power supply circuit.

17. The video camera system of claim 10, wherein the at least one housing is a standard PAR 38 flood lamp housing.

18. A video camera concealed surveillance system capable of capturing a video signal at a first location and directing the video signal to a second location over a common AC powerline scheme, the AC powerline scheme having at least one standard screw-in type AC receptacle and at least one standard three prong AC outlet, the video camera system comprising:
   a) a housing having front and back ends and an inner enclosed cavity, the front end having a larger circumference than the back end, the front end closed by an opaque cover, the back end supporting a single conductor screw-in type AC electrical fitting, the AC electrical fitting engaging the at least one AC receptacle along the AC powerline scheme, the housing proximally disposed to the first location,
   b) a first circuit board enclosed within the housing cavity and having a video camera and a plurality of white infrared light emitting diodes mounted thereupon, the video camera disposed within the housing such that a lens of the video camera is directed towards the front end thereof, the plurality of white infrared light emitting diodes surrounding the video camera lens,
   c) a second circuit board enclosed within the housing cavity and having a video signal encoder mounted thereupon, the second circuit board electrically coupled to the first circuit board, the video signal encoder modulating the captured video signal upon the AC powerline,
   d) a power supply circuit enclosed within the housing cavity and electrically coupled to the first and second circuit boards and the AC electrical fitting,
   e) a video signal decoder disposed at the second location and capable of demodulating the captured video-signal modulated upon the AC powerline by the video signal encoder, and
   f) a video monitor electrically coupled to the at least one three prong AC outlet and the video signal decoder, the video monitor capable of displaying the captured video signal demodulated by the video signal decoder.

19. The video camera system of claim 18, wherein the power supply circuit comprises:
   a) a transformer for reducing the AC voltage,
   b) a bridge rectifier coupled to the transformer and having a DC voltage output, the bridge rectifier converging the reduced AC voltage to a DC voltage,
   c) a voltage regulator coupled to the bridge rectifier DC voltage output and having a DC voltage output, the voltage regulator providing a steady positive logic voltage for the camera system,
   d) a voltage converter coupled to the voltage regulator DC voltage output, the voltage converter providing a steady negative logic voltage for the camera system by inverting the positive logic voltage, and
   e) means for filtering parasitic high frequency oscillations introduced into the power supply circuit.

* * * * *